Patented June 3, 1930

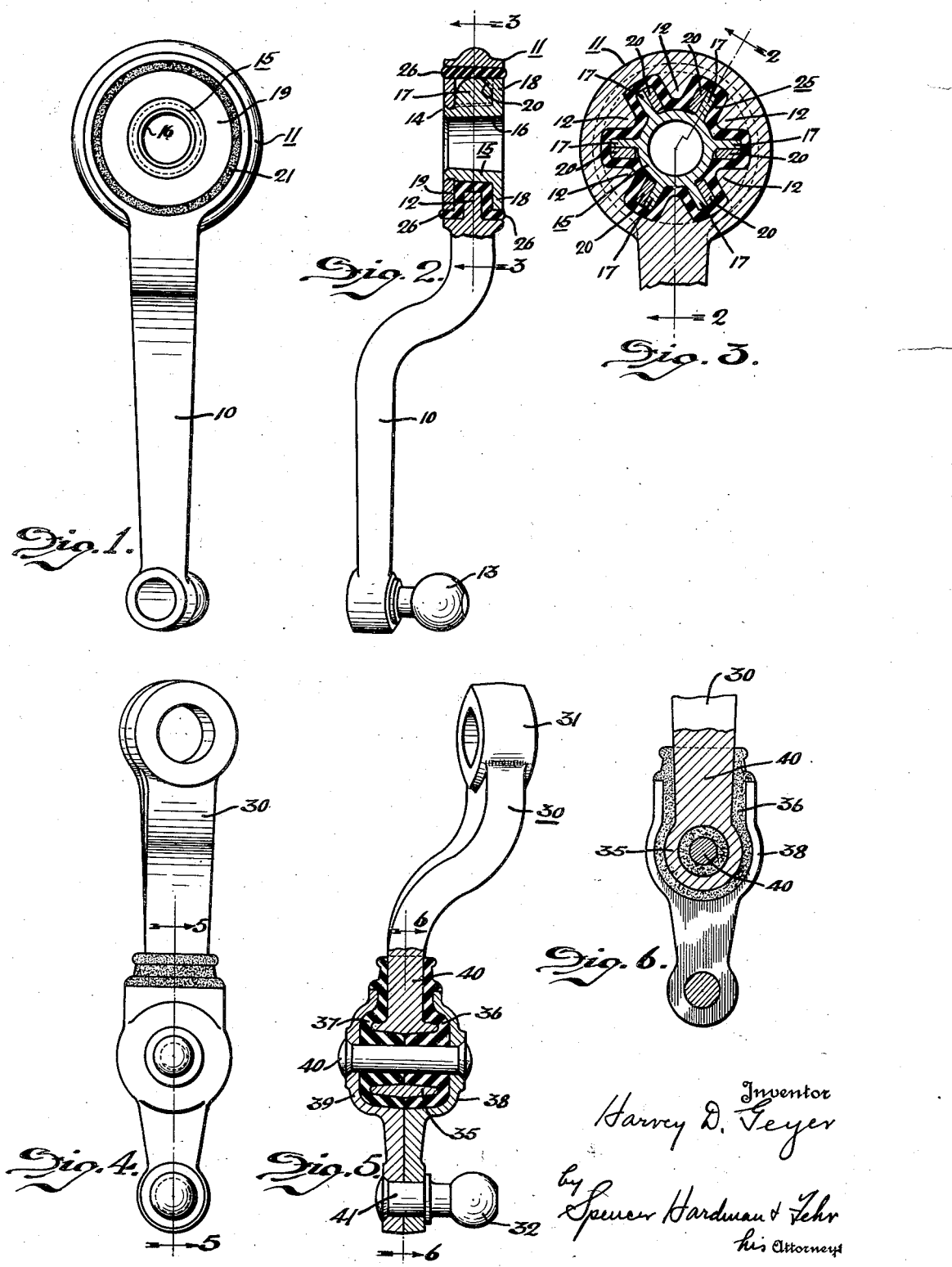

1,761,526

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

SHOCK-ABSORBING PITMAN ARM

Application filed May 21, 1928. Serial No. 279,367.

This invention relates to a shock-relieving pitman arm especially adapted for use in steering mechanism of automotive vehicles.

An object of this invention is to provide a pitman arm having a joint therein containing yielding elastic non-metallic material which breaks the metal connection between the parts connected by said arm, whereby to minimize the transmission of vibrations and shocks thru said pitman arm.

A more specific object is to provide such a pitman arm for the steering mechanism of automotive vehicles having a yielding joint therein including soft rubber as the isolating non-metallic material for dampening vibrations or shocks which would otherwise be transmitted from the front wheels of the vehicle thru the steering mechanism to the steering wheel, which is grasped by the driver thereof.

Further objects and advantages of the present invention will be apparent from the following description, reference being had to the accompanying drawings, wherein a preferred form of embodiment of the present invention is clearly shown.

In the drawings:

Fig. 1 is an elevation of a pitman arm built according to this invention, for use in the steering mechanism of an automobile.

Fig. 2 is a view taken at right angles to Fig. 1, and shows the elastic joint in section taken on line 2—2 of Fig. 3.

Fig. 3 is a section thru the elastic joint taken on line 3—3 of Fig. 2.

Figs. 4, 5, and 6 show a modified form of pitman arm, Fig. 4 being an elevation, Fig. 5 a section on line 5—5 of Fig. 4, and Fig. 6 a section on line 6—6 of Fig. 5.

In the drawings similar reference characters refer to similar parts.

In Figs. 1 to 3, numeral 10 designates the main metal body of the pitman arm which is enlarged at its pivot end into an outer metal ring member 11, which is preferably integral with the body 10. This ring portion 11 has a series of inwardly radially projecting lugs 12, preferably integral with the ring 11, but of materially narrower width than said ring, as clearly shown in Fig. 2.

An interior metal sleeve 15 has a central aperture 16 therein which is adapted to be rigidly fixed to the shaft (not shown), which is partially rotated in either direction by movement of the steering wheel in a manner well known in the art. Sleeve 15 has a series of outwardly projecting lugs 17 and an end flange 18, both preferably integral therewith, as shown in Figs. 2 and 3. Opposed to the integral flange 18 there is fixed to the bushing 15 by any suitable means the separate flange 19, which has radial lugs or projections 20 correspondingly arranged so as to slide upon and lie immediately against the radial lugs 17 when the separate flange 19 is inserted in place upon the end of sleeve 15. A soft rubber bushing 25 molded to a shape corresponding approximately to the interior space between the outer ring member 11 and the inner sleeve 15 with end flanges 18 and 19 thereon is inserted in place and held under initial compression between these parts.

In assembling these parts, the flexible soft rubber bushing 25 may be first inserted somewhat loosely within the ring member 11 so that the inwardly projecting lugs 12 fall within the cavities in the rubber provided therefor. Next, the inner sleeve 15 is inserted laterally within the rubber bushing 25, so that the lugs 17 fall within and partially fill the cavities in the rubber provided therefor. Lastly, the separate end flange 19 is slid into place over the projecting end of sleeve 15 so that the lugs 20 thereon slide in contact with the lugs 17 and completely fill the radial cavities in the rubber, as shown in Fig. 3. The separate flange 19 is forced into final position by any suitable means, thus compressing the entire mass of rubber 25 and forcing it into tight non-slipping contact with its confining metal surfaces and causing it to bulge out slightly at its unconfined annular surfaces, as at 26 (see Fig. 2). The flange 19 is shown held in its final position by expanding the end of sleeve 15, as clearly shown at 14, in Fig. 2.

It will now be clear that there is no metallic connection between the ring member 11 and the inner sleeve member 15, yet torque will be somewhat yieldably transmitted from inner member 15 to the ring 11 by compression of the portions of the soft rubber 25 lying between the alternately arranged lugs 12 and 17. Hence, the soft rubber 25 permits a driving connection between the pivot shaft (not shown) upon which member 15 is fixed and the drag link (not shown) which is connected to the ball 13 at the outer end of arm 10 in a well known manner. The soft rubber 25 will yield slightly and thus smooth out and relieve sudden shocks which may be caused by the front wheels of the vehicle striking obstructions in their path. Rubber bushing 25 will also damp out small vibrations of the outer end of arm 10 and prevent or minimize the vibration of the steering wheel by breaking the metallic connection between arm 10 and the steering wheel. It will be noted that the rubber 25 will yield in any direction and therefore permits a slight universal movement of the pitman arm 10 upon the rocker shaft to which sleeve 15 is fixed.

In Figs. 4, 5, and 6, the pitman arm 30 is shown with a soft rubber isolating joint built therein nearer its outer or swinging end. The pivot end 31 of arm 30 is fixed to the rocker shaft (not shown) while the ball 32 at the outer end thereof is connected to a corresponding socket in the drag link (not shown) in a well known manner. The forging 30 is provided with an integral sleeve 35 at its outer end. Two similar molded soft rubber blocks 36 and 37 completely enclose the sleeve 35 and a short portion 40 of the shank of forging 30. Two half housings 38 and 39 confine the soft rubber blocks under an initial compression by being clamped tightly thereupon by the rivet 40 which extends axially thru the sleeve 35. The half housings are also held clamped together by the shank 41 of the ball 32 at the outer end of the pitman arm. It will now be clear that the forging 30 is completely isolated from the half housings 38 and 39 by the soft rubber blocks 36 and 37, but that the bending stresses in the pitman arm will be yieldably transmitted thru this rubber joint chiefly by the compression of the rubber interposed between the shank portion 40 and the exterior metal housing. It will be also clear that this form of joint is slightly yieldable in all directions.

While the form of embodiment of the present invention as herein disclosed, constitutes a preferred form, it is to be understood that other forms might be adopted, all coming within the scope of the claims which follow.

What is claimed is as follows:

1. In an automotive vehicle, a steering mechanism including a pitman arm for translating oscillatory rotary movement to reciprocating movement, said pitman arm having a universally yielding soft rubber joint therein which provides a non-metallic connection between the two ends of said arm.

2. In an automotive vehicle, a steering mechanism including a pitman arm for translating oscillatory rotary movement to reciprocating movement, said arm having an isolating non-metallic joint therein universally yieldable under bending stresses in said arm, whereby vibrations in said steering mechanism are dampened.

3. A steering mechanism for an automotive vehicle including a pitman arm having an isolating elastic rubber joint therein universally yieldable under bending stresses in said arm.

4. A steering mechanism for an automotive vehicle including a pitman arm having an isolating elastic rubber joint therein slightly yieldable under bending stresses in said arm, said arm comprising: an inner metal member at the pivot end of said arm having outwardly radially projecting lugs thereon, an outer metal ring member surrounding said inner member but spaced therefrom and having inwardly projecting lugs alternately arranged relative to said outwardly projecting lugs, and a soft rubber bushing filling the space between said inner and outer members and completely isolating said members.

5. A pitman arm comprising: an inner metal member at the pivot end of said arm adapted to be fixed to a rotary member and having outwardly projecting lugs thereon, an outer metal ring member surrounding said inner member in spaced relation therewith and having radial inwardly projecting lugs alternately arranged between said outwardly projecting lugs, and an elastic rubber bushing filling the space between said inner and outer members and forming a torque transmitting means therebetween.

In testimony whereof I hereto affix my signature.

HARVEY D. GEYER.